(12) United States Patent
Wallace

(10) Patent No.: US 10,059,611 B2
(45) Date of Patent: Aug. 28, 2018

(54) SYSTEM AND METHOD FOR REGENERATING AN ION SEPARATION RESIN

(71) Applicant: Enviro Water Minerals Company, Inc., Houston, TX (US)

(72) Inventor: Paul Steven Wallace, Katy, TX (US)

(73) Assignee: Enviro Water Minerals Company, Inc., Houston, TX (US)

( * ) Notice: Subject to any disclaimer, the term of this patent is extended or adjusted under 35 U.S.C. 154(b) by 491 days.

(21) Appl. No.: 14/730,043

(22) Filed: Jun. 3, 2015

(65) Prior Publication Data

US 2015/0344341 A1 Dec. 3, 2015

Related U.S. Application Data

(60) Provisional application No. 62/007,342, filed on Jun. 3, 2014.

(51) Int. Cl.
*B01D 61/00* (2006.01)
*C02F 9/00* (2006.01)
(Continued)

(52) U.S. Cl.
CPC .................. *C02F 9/00* (2013.01); *C02F 1/42* (2013.01); *C02F 1/441* (2013.01);
(Continued)

(58) Field of Classification Search
CPC .......... C02F 1/42; C02F 9/00; C02F 2201/00; C02F 2201/002; C02F 2209/003;
(Continued)

(56) References Cited

U.S. PATENT DOCUMENTS 3,239,063 A * 3/1966 Lamkin ..................... C02F 1/42
210/140
5,824,279 A 10/1998 Richmond et al.
(Continued)

FOREIGN PATENT DOCUMENTS

DE 19825981 A1 * 12/1999 ......... A47L 15/4229

OTHER PUBLICATIONS

2009, Miller, Water Technologies & Solutions, Suez, pp. 1-13 (Year: 2009).*

(Continued)

*Primary Examiner* — Allison G Fitzsimmons
(74) *Attorney, Agent, or Firm* — Fletcher Yoder, PC

(57) ABSTRACT

A method includes flowing brine including one or more hardness minerals from a desalination system to a mineral removal system. The method also includes removing the one or more hardness minerals from the brine in an ion separation system disposed upstream from and fluidly coupled to the mineral removal system. The ion separation system may generate a first softened brine and includes a plurality of ion exchange subsystems each including an ion exchange resin. The method also includes saturating the ion exchange resin of at least one ion exchange subsystem with the one or more hardness minerals removed from the brine and regenerating the saturated ion exchange resin. The method further includes recovering the one or more hardness minerals from the ion exchange resin via the mineral removal system. The mineral removal system is fluidly coupled to the ion separation system.

20 Claims, 5 Drawing Sheets

(51) Int. Cl.
*C02F 1/42* (2006.01)
*C02F 1/44* (2006.01)
*C02F 103/08* (2006.01)

(52) U.S. Cl.
CPC .... *C02F 2103/08* (2013.01); *C02F 2209/005* (2013.01); *C02F 2301/08* (2013.01); *C02F 2303/22* (2013.01); *Y02A 20/131* (2018.01)

(58) Field of Classification Search
CPC .......... C02F 2209/005; C02F 2209/006; C02F 2303/22; C02F 1/44; B01D 24/00; B01D 24/36; B01D 24/46; B01D 61/00; B01D 61/02; B01D 61/04; B01D 61/58; B01J 20/282; B01J 20/283; B01J 20/285; B01J 39/00; B01J 41/00; B01J 47/00; B01J 47/02; B01J 49/00; B01J 49/60
USPC ....... 210/634, 638, 641, 649, 650, 651, 652, 210/660, 663, 670, 681, 687, 767, 295, 210/263, 269

See application file for complete search history.

(56) References Cited

U.S. PATENT DOCUMENTS

| 7,041,223 | B2 | 5/2006 | Jensen et al. | |
| 2009/0261039 | A1* | 10/2009 | Paillard | C02F 9/00 210/638 |
| 2011/0278225 | A1* | 11/2011 | Boodoo | C02F 9/00 210/636 |

OTHER PUBLICATIONS

Miller, Understand Ion-Exchange Resins for Water Treatment Systems, GE Water & Process Technologies, Feb. 19, 1981, pp. 1-13, General Electric Company.
Meyers, Applications of Weak Acid Cation Resin in Waste Treatment, Jun. 1999, pp. 1-9, ResinTech Inc.
Heins et al., Use of Evaporation for Heavy Oil Produced Water Treatment, GE Water & Process Technologies, 2006, pp. 1-6, General Electric Company.
Vantage Pre-Treatment-Industrial (PTI) Series Softeners High Flow Systems, 2010, pp. 1-2, Siemens Water Technologies.
Husky Tuker Lake Project—an Aquatech SAGD Installation, Project Profile Series #38, May 23, 2014, pp. 1-2, Aquatech International Corporation.
C-104 Weak Acid Cation Exchange Resin, Purolite Ion Exchange Resins, May 23, 2014, pp. 1-8.

* cited by examiner

SYSTEM AND METHOD FOR REGENERATING AN ION SEPARATION RESIN

CROSS REFERENCE TO RELATED APPLICATION

This application benefits from the priority of U.S. Provisional Patent Application No. 62/007,342, entitled "Mineral Recovery System," filed Jun. 3, 2014, which is hereby incorporated by reference in its entirety.

BACKGROUND

The subject matter disclosed herein generally relates to desalination systems, and more particularly, to a system for recovering hardness minerals.

There are several regions in the United States (e.g., the southwestern United States including New Mexico, Southern California, and parts of Texas) and throughout the world that experience shortages in potable water supplies due, in part, to the arid climate of these geographic locales. As water supplies are limited, innovative technologies and alternative water supplies for both drinking water and agriculture may be utilized. One method for obtaining an alternative source of potable water uses desalination systems to produce the potable water.

The desalination process may involve the removal of salts from seawater, agricultural run-off water, and/or brackish ground water brines to produce potable water. Membrane-based desalination may use an assortment of filtration methods, such as nanofiltration and reverse osmosis, to separate the raw brine stream into a desalinated water stream and a tailing stream. The tailing streams may contain various salts and other materials left over after the desalination process. Included in these tailing streams may be valuable salts and minerals which may be extracted using membrane-based and/or evaporative techniques.

BRIEF DESCRIPTION

In one embodiment, a method includes flowing brine from a desalination system to a mineral removal system. The brine comprises one or more hardness minerals. The method also includes removing the one or more hardness minerals from the brine in an ion separation system disposed upstream from and fluidly coupled to the mineral removal system. The ion separation system may generate a first softened brine. The ion separation unit includes a plurality of ion exchange subsystems each including an ion exchange resin. The method also includes saturating the ion exchange resin of at least one ion exchange subsystem of the plurality of ion exchange subsystems with the one or more hardness minerals removed from the brine and regenerating the saturated ion exchange resin. Regenerating the saturated ion exchange resin includes removing the one or more hardness minerals from the ion exchange resin. The method also includes recovering the one or more hardness minerals from the ion exchange resin via the mineral removal system. The mineral removal system is fluidly coupled to the ion separation system.

In another embodiment, a system includes an ion separation unit including an ion exchange resin that may absorb hardness minerals from a brine stream. The ion separation unit may generate a softened water stream and a concentrated hardness mineral stream. The system also includes a reverse osmosis system downstream from and fluidly coupled to the ion separation unit. The reverse osmosis system may receive the softened water stream and may generate a softened RO permeate. The system also includes a resin regeneration system fluidly coupled to the ion separation unit that may supply a fluid to the ion separation unit. The fluid releases the hardness minerals from the ion exchange resin and replaces the hardness minerals with monovalent cations. The system further includes a controller including one or more tangible, non-transitory, machine-readable media collectively storing one or more sets of instructions, and one or more processing devices that may execute the one or more sets of instructions to monitor, control, or a combination thereof, operation of the system. The one or more sets of instructions may use the one or more processing devices to monitor a hardness of the softened water stream and to control regeneration of the ion exchange resin based on the hardness of the softened water stream. The one or more processing devices may also direct at least a portion of the softened RO permeate to the ion separation unit upon detection of the softened water stream reaching a hardness limit.

In a further embodiment, a system includes an ion separation unit including a plurality of ion exchange subsystems. Each ion exchange subsystem of the plurality of ion exchange subsystems includes an ion exchange resin that may absorb hardness minerals from a brine stream. The ion separation unit may generate a softened water stream and a concentrated mineral stream including the hardness minerals. The system also includes a controller including one or more tangible, non-transitory, machine-readable media collectively storing one or more sets of instructions, and one or more processing devices that may execute the one or more sets of instructions to monitor, control, or a combination thereof, operation of the system. The one or more sets of instructions may use the one or more processing devices to monitor a hardness of the softened water stream and to control resin regeneration based on the hardness of the softened water stream.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
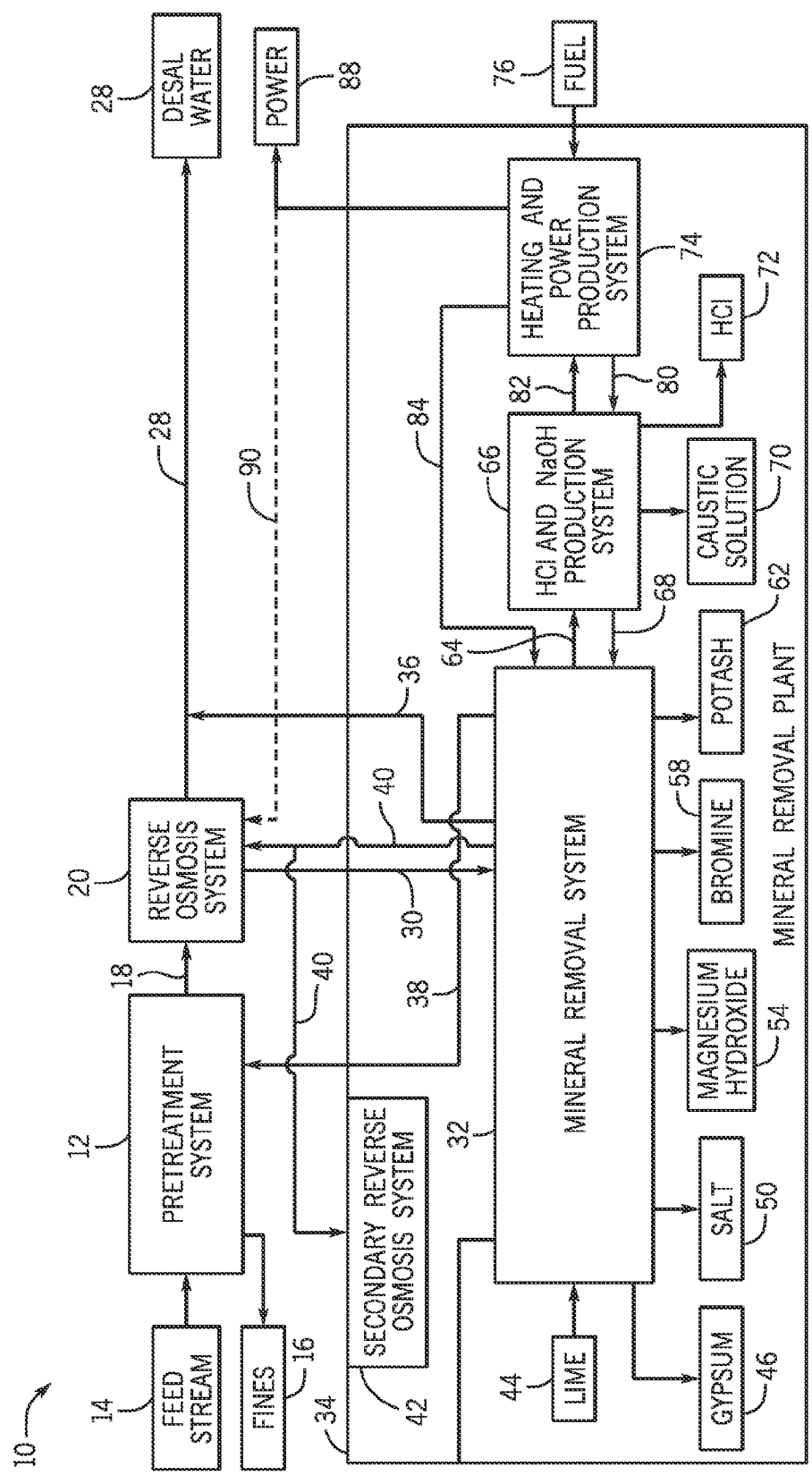
FIG. 1 is a block diagram of an embodiment of a water processing system including a mineral removal system, in accordance with aspects of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include a water processing system configured to soften high salinity brine generated during desalination of water (e.g., seawater, agricultural run-off water, and/or brackish ground water). The water processing system includes one or more ion separation systems configured to extract minerals (e.g., calcium, magnesium, sodium, and sulfate) from tailing streams (e.g., nanofiltration (NF) non-permeate streams, electrodialysis (ED) non-permeate streams, and/or reverse osmosis (RO) non-permeate streams) that may otherwise be discarded, and to generate softened water. The extracted minerals may be recovered as industrial grade products for commercial use.

The ion separation systems utilize ion exchange softeners that include a resin that facilitates removal of hardness ions (e.g., calcium ions ($Ca^{2+}$) and/or magnesium ions ($Mg^{2+}$)) from the water, thereby generating the softened water (e.g., sodium chloride (NaCl) brine). Due to the high salinity of the brine streams softened by the ion exchange softeners, the resin in the softeners may rapidly become saturated with hardness minerals (e.g., the hardness ions). Therefore, the resin may be regenerated frequently to strip the hardness minerals from the resin such that the resin may be reused. For example, the resin may be flushed with hydrochloric acid (HCl) to remove the hardness minerals from the resin by replacing the hardness minerals with protons (i.e., the hydrogen atom in the HCl), thereby converting the resin into a hydrogen form resin. Following HCl treatment, the resin is generally rinsed with softened water to remove residual acid (e.g., HCl) from the resin. This resin is then neutralized with caustic (NaOH) to replace the proton in the hydrogen form resin with sodium (Na) to generate a sodium form resin. The sodium in the resin exchanges with the hardness minerals (e.g., hardness ions), thereby softening the water. That is, the sodium form resin absorbs the hardness minerals and releases the sodium into the water, thereby producing softened sodium chloride brine.

Regeneration of the resin generates a concentrated brine stream having the hardness minerals. In general, the concentrated brine stream is discarded as a waste stream. However, the hardness minerals in the concentrated brine stream may be recovered for commercial use (e.g., in the form of calcium chloride ($Ca_2Cl$) and magnesium hydroxide ($Mg(OH)_2$)). In addition, desalinated water generated from desalination of the softened NaCl brine may be used to rinse the resin during the regeneration of the resin to remove undesirable compounds that may contaminate and decrease a purity of the hardness minerals downstream of the softeners. Spent rinse water may be recirculated through the ion exchange softeners to capture any hardness minerals that may have been removed from the ion exchange softener during rinsing. In this way, an amount of waste generated by the desalination system may be reduced. Accordingly, the systems and methods disclosed herein include a resin regeneration system that recover the hardness minerals from the resin, regenerates the resin, and recycles byproducts generated during resin regeneration cycles that may otherwise be regarded as waste streams.

FIG. 1 is a block diagram of an embodiment of a water processing system 10 that may include an ion separation system. For example, the water processing system 10 may be part of a water desalination system, waste water treatment system, water purification system, oil and gas brine treating system, or any other suitable water processing system. In the illustrated embodiment, the water processing system 10 is used to produce desalinated water from a feed stream (e.g., ground water, seawater, brackish water, or any other brine stream) and to remove minerals from the feed stream. For example, the water processing system 10 may be used to produce high purity agricultural grade gypsum ($CaSO_4.2H_2O$) (e.g., approximately greater than 97 wt % gypsum on a dry basis), industrial grade caustic (e.g., approximately greater than 97 wt % sodium hydroxide (NaOH) on a dry basis), industrial grade magnesium hydroxide ($Mg(OH)_2$) (e.g., approximately greater than 98 wt % $Mg(OH)_2$ on an ignited basis, or on an ignited oxide basis) suitable for industrial magnesia refractory, industrial grade sodium chloride (NaCl) (e.g., approximately greater than 99.9 wt % NaCl on a dry basis), concentrated HCl for commercial use (e.g., approximately 10 wt % to 22 wt %), and/or desalinated water (e.g., approximately less than 1000 parts per million (ppm) total dissolved solids (TDS)) from underground brines, seawater desalination waste brines, and/or brackish water desalination waste brines. Furthermore, the water processing system 10 may use one or more of gypsum precipitation, magnesium hydroxide precipitation, reverse osmosis (RO), electrodialysis (ED), and/or softening and nanofiltration (NF) to remove the minerals from brines as industrial grade products and/or to substantially reduce (or eliminate) a waste brine stream.

In the illustrated embodiment, the water processing system 10 includes a pretreatment system 12 configured to receive a feed stream 14. The feed stream 14 may be received from any suitable water source. For example, the feed stream 14 may be received from ground water, seawater, brackish water, and so forth. Moreover, the feed stream 14 may contain various elements and/or compounds. For example, the feed stream 14 may contain NaCl, sulfate ($SO_4$), calcium (Ca), magnesium (Mg), and/or silicon dioxide (silica or $SiO_2$), among other components. In certain embodiments, the feed stream 14 may contain approximately 0.50 to 3.00 g/L NaCl, approximately 0.10 to 1.50 g/l $SO_4$, approximately 0.01 to 0.80 g/L Ca and Mg, and/or approximately 0.01 to 0.30 g/L $SiO_2$. Furthermore, in certain embodiments, the feed stream 14 may have a pH range between approximately 5 and 9. For example, the feed stream 14 may have a pH of approximately 8.

The pretreatment system 12 receives the feed stream 14 and removes solid materials (e.g., fines 16), such as iron (Fe) and manganese (Mn), from the feed stream 14. The pretreatment system 12 provides a pretreated feed stream 18 to a reverse osmosis (RO) system 20. The RO system 20 receives the pretreated feed stream 18 and produces a desalinated water stream 28. In certain embodiments, the desalinated water stream 28 may include $SiO_2$. Moreover, the desalinated water stream 28 may have a pH of approximately 7.5. Furthermore, the RO system 20 provides a brine stream 30 to a mineral removal system 32. In certain embodiments, the desalinated water stream 28 may be approximately 70 percent to approximately 90 percent of the output from the RO system 20, and the brine stream 30 may be approximately 10 percent to approximately 30 percent of the output from the RO system 20. For example, in some embodiments, the desalinated water stream 28 may be approximately 80 percent of the output from the RO system 20, and the brine stream 30 may be approximately 20 percent of the output from the RO system 20. As may be appreciated, while the illustrated embodiment uses the RO system 20, other embodiments may use nanofiltration (NF) in place of RO to generate the desalinated water 28 and the brine stream 30.

In certain embodiments, the mineral removal system 32 may be part of a mineral removal plant 34. The mineral removal plant 34 is configured to remove minerals, elements, and/or compounds from the brine stream 30. As discussed in further detail below, the mineral removal plant may include one or more desalination systems that may facilitate removal and recovery of minerals from the brine stream 30. The brine stream 30 may be provided to the mineral removal plant 34 from any suitable source and/or system. In certain embodiments, the brine stream 30 may include substantial amounts of NaCl, sodium sulfate ($Na_2SO_4$), calcium (Ca), and/or magnesium (Mg). The mineral removal system 32 may generate one or more desalination streams 36 that include desalinated water (which may contain $SiO_2$). Furthermore, the one or more desalination streams 36 may include a disinfectant and/or oxidant. The disinfectant and/or oxidant may be provided to the pretreatment system 12 via a disinfectant stream 38. Additionally, in certain embodiments, the mineral removal system 32 may provide a softened water stream 40 to the RO system 20 and/or to a secondary RO system 42 or NF system, as will be discussed in detail below.

A lime based material 44 (e.g., lime, quick lime, dolomitic lime, etc.) may be provided to the mineral removal system 32 to facilitate mineral removal from the brine stream 30. During operation, the mineral removal system 32 may be configured to remove any suitable minerals, elements, and/or compounds from the brine stream 30. For example, the mineral removal system 32 may generate a gypsum stream 46 (e.g., agricultural grade gypsum), a salt stream 50 (e.g., industrial grade sodium chloride), a magnesium hydroxide stream 54 (e.g., industrial grade magnesium hydroxide), a bromine stream 58, a potash stream 62, and/or any other suitable mineral stream depending on the mineral content of the brine stream 30.

The mineral removal system 32 may generate additional streams that may be collected for commercial use and/or utilized in a downstream process of the water processing system 10. In the illustrated embodiment, the mineral removal system 32 provides at least one output stream 64 to an HCl and NaOH production system 66. For example, the mineral removal system 32 may provide a NaCl brine to the HCl and NaOH production system 66. Furthermore, in the illustrated embodiment, the mineral removal system 32 receives at least one input stream 68 from the HCl and NaOH production system 66. The input stream 68 may provide the mineral removal system 32 with HCl and/or caustic (e.g., NaOH) produced by the HCl and NaOH production system 66. In addition, in the illustrated embodiment, the HCl and NaOH production system 66 generates a caustic solution 70 (e.g., NaOH) and/or a concentrated HCl solution 72 that is not used by the mineral removal system 32 (e.g., produced to be sold).

The mineral removal plant 34 also includes a heating and power production system 74. The heating and power production system 74 may include a natural gas engine and/or a boiler. The heating and power production system 74 is configured to receive a fuel 76. The fuel 76 may be any suitable fuel, such as natural gas, synthetic natural gas (e.g., syngas), or a combination thereof. The heating and power production system 74 may provide power, steam, hot water, any suitable heated fluid, and so forth to the HCl and NaOH production system 66, as indicated by arrow 80. Moreover, the heating and power production system 74 may receive a cooled fluid stream 82 (e.g., cooled water) from the HCl and NaOH production system 66. As illustrated, the heating and power production system 74 may also provide power to the mineral removal system 32, as indicated by arrow 84. Additionally, the heating and power production system 74 may provide power to the RO system 20, as indicated by arrow 90, and/or to another suitable system 88.

Figure 2:
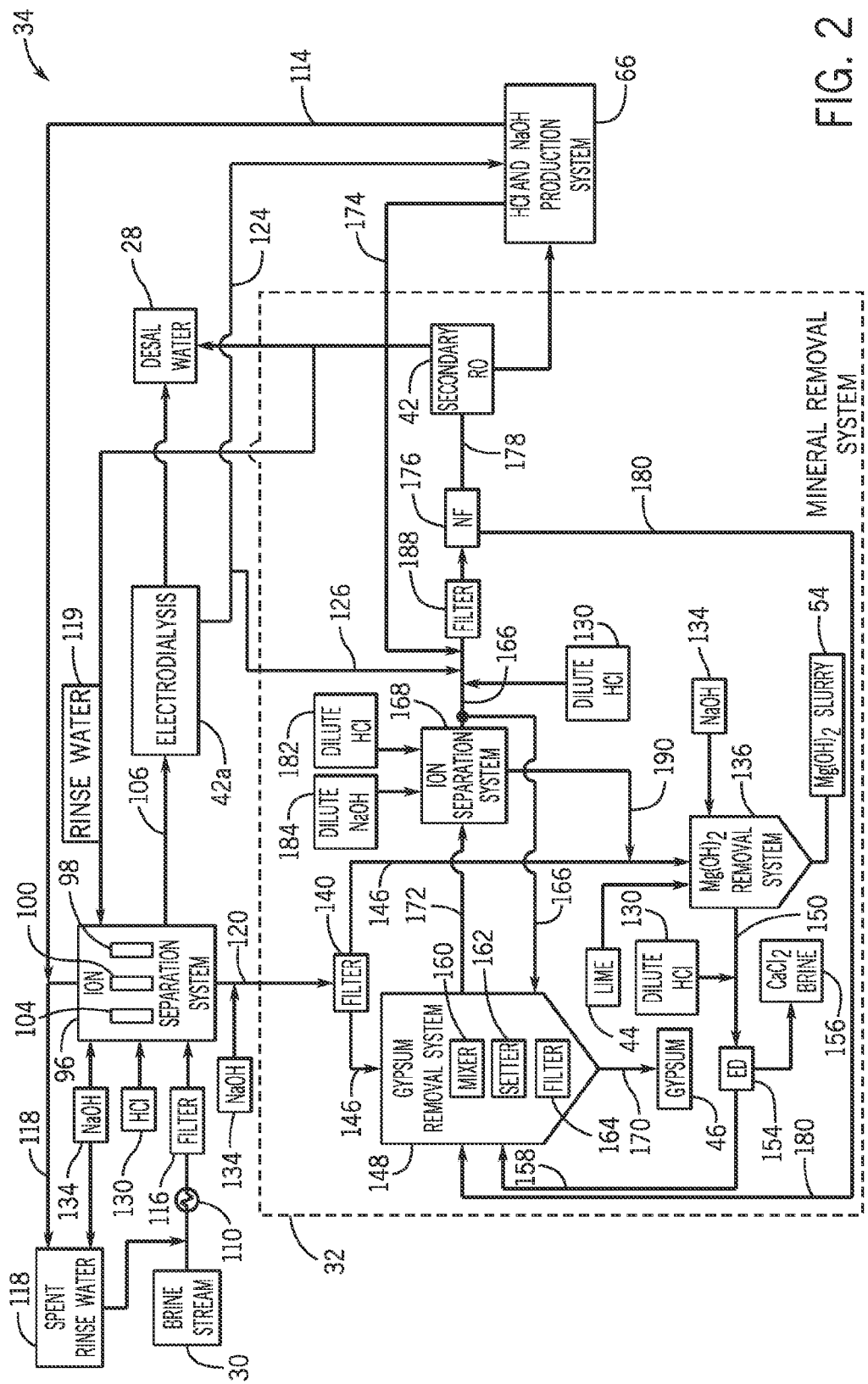
FIG. 2 is a block diagram of an embodiment of a mineral removal plant having the mineral removal system of FIG. 1 and an array of ion exchange subsystems that remove hardness minerals from a brine stream, in accordance with aspects of the present disclosure.

As discussed above, it may be desirable to recover the calcium and magnesium from the brine stream 30 for commercial use, thereby decreasing the overall waste and waste disposal costs associated with the system 10. FIG. 2 is a block diagram of an embodiment of the mineral removal plant 34 that may be used in the system 10 to reduce the salinity of the brine stream 30. As previously described, the mineral removal system 32 receives the brine stream 30 from the first RO system 20. As may be appreciated, the brine stream 30 may contain various hardness elements and/or compounds. For example, the brine stream 30 may contain various salts and minerals such as, but not limited to, NaCl, $SO_4$, Ca, Mg, and/or $SiO_2$. In certain embodiments, the brine stream 30 may contain approximately 3.0 g/L (3,000 ppm) to approximately 8.0 g/L (8,000 ppm) NaCl, approximately 3.0 g/L (3,000 ppm) to approximately 8.0 g/L (8,000 ppm) $SO_4$, approximately 0.1 g/L (100 ppm) to approximately 0.4 g/L (400 ppm) Mg, approximately 0.2 g/L (200 ppm) to approximately 0.6 g/L (600 ppm) Ca, approximately 0.05 g/L (50 ppm) to approximately 0.02 g/L (200 ppm) $SiO_2$, or a combination thereof. Furthermore, in certain embodiments, the brine stream 30 may have a pH range between approximately 4 and approximately 8. For example, the brine stream 30 may have a pH of approximately 6.

In the illustrated embodiment, the brine stream 30 flows through an ion separation system 96 that includes an array of ion exchange subsystems 98, 100, 104. Each ion exchange subsystem 98, 100, 104 includes one or more ion exchange softeners (e.g., weak acid cation (WAC) softeners), which are described in further detail below with reference to FIGS. 3A and 3B. The ion exchange subsystems 98, 100, 104 remove the hardness minerals (e.g., approximately greater than 99 percent of the hardness minerals) from the brine stream 30, thereby reducing a hardness of the brine stream 30 and generating a softened NaCl brine stream 106. In certain embodiments, the brine stream 30 may be heated before softening in the ion separation system 96. For example, in the illustrated embodiment, the brine stream 30, which is pressurized to between approximately 690 kilopascals (kPa) and approximately 1035 kPa (approximately 100 pounds per square inch gauge (psig) and approximately 150 psig), flows through a heat exchanger 110. The heat exchanger 110 transfers heat from water, which is heated in the HCl and NaOH production system 66, to the brine stream 30, thereby heating the brine stream 30 to between approximately 30° C. and approximately 40° C. (approximately 90° F. and approximately 100° F.). In certain embodiments, the brine stream 30 may be treated with HCl and/or caustic (e.g., NaOH) generated in the HCl and NaOH production system 66 to adjust a pH of the brine stream 30 to between approximately 6 and approximately 7.5. A pH of between approximately 6 and approximately 7.5 may mitigate solubilization of silicon dioxide ($SiO_2$), carbonates, and/or other undesirable minerals within the brine stream 30, which may lead to scaling of downstream components.

In addition to pre-heating the brine stream 30, the brine stream 30 may be filtered in first filter 116 downstream from the heat exchanger 110. The first filter 116 may remove particulates (e.g., gypsum, carbonate, silica, or the like) that may be present in the brine stream 30 or formed during heating and treatment of the brine stream 30 with the caustic and/or HCl. The filter (e.g., the first filter 116) may be a 4 to 6 micron cartridge filter. However, any other suitable filter may be used to remove the particulates.

Following filtration, the brine stream 30 is fed to the ion separation system 96, which removes the hardness minerals (e.g., Ca and Mg), and generates the softened NaCl brine stream 106 (e.g., softened effluent) and a concentrated brine stream 120 containing the hardness minerals. In certain embodiments, the softened NaCl brine stream 106 is directed to the electrodialysis (ED) system 42a to generate the desalinated water 28 and a concentrated NaCl brine stream 124. The concentrated NaCl brine stream 124 may be fed to the HCl and NaOH production system 66 to facilitate production of HCl and/or NaOH. For example, the concentrated NaCl stream 124 may be used to generate various caustic and HCl streams (e.g., the caustic solution 70 and the HCl 72) within the HCl and NaOH production system 66. In one embodiment, at least a portion of the concentrated NaCl brine stream 124 may be routed to the mineral removal system 32, as indicated by arrow 126. In certain embodiments, a nanofiltration (NF) system may be used instead of the secondary RO system 42.

As discussed above, the ion separation system 96 removes the hardness minerals from the brine stream 30 to soften the brine stream 30 and generate the softened NaCl brine stream 106, which generates the desalinated water stream 28. Over time, the resin in the ion exchange softeners of the ion separation system 96 may become saturated with hardness minerals. As such, a concentration of the hardness minerals in the softened NaCl brine stream 106 may increase to undesirable levels. Therefore, the resin may be regenerated to remove the hardness minerals, which are absorbed onto the resin, thereby enabling the resin to continue softening the brine stream 30. In general, the regeneration of the resin releases the hardness minerals absorbed into the resin and replaces the hardness minerals with sodium (Na), which enables the resin to soften the brine stream 30. For example, the resin may be rinsed with a rinsing fluid (e.g., water) before resin regeneration to remove undesirable components from the ion exchange subsystems 98, 100, 104 that may contaminate and decrease the purity of the hardness minerals. In certain embodiments, desalinated water (e.g., from the desalinated water stream 28) may be used to flush the ion exchange subsystems 98, 100, 104, thereby removing the brine remaining in the ion exchange units 98, 100, 104. The desalinated water 28 may displace the brine from the subsystem 98, 100, 104. In this way, sodium chloride from the brine may not contaminate the hardness minerals recovered from the ion separation system 96, as discussed in further detail below. While in the illustrated embodiment the ion separation system 96 receives the desalinated water 28 (e.g., RO permeate) from the secondary RO system 42, in certain embodiments, the ion separation system 96 may receive the desalinated water 28 from the RO system 20.

The effluent generated after rinsing the subsystems 98, 100, 104 with the desalinated water 28 may be referred to as spent rinse water 118. Generally, the spent rinse water is discarded as a waste stream, thereby increasing an amount of waste generated by the system 32, which may increase waste disposal costs. However, the spent rinse water may include hardness minerals that may be recovered to generate the gypsum 46, magnesium hydroxide 50, and other desirable salts for commercial use. Therefore, in accordance with the disclosed embodiments, spent rinse water 118 generated from rinsing the resin with rinse water 119 (e.g., the desalinated water 28) may be recirculated through the ion separation system 96 to remove and recover the hardness minerals. For example, in the illustrated embodiment, the spent rinse water 118 is combined with the brine stream 30 upstream of the heat exchanger 110. The mixture of the brine stream 30 and the spent rinse water 118 is fed to the ion separation system 96 to remove the hardness minerals and to generate the softened NaCl brine stream 106. As should be appreciated, the spent rinse water 118 may also be combined with the brine stream 30 downstream from the heat exchanger 110. In this way, waste from rinsing the subsystems 98, 100, 104 may be reduced or eliminated. In certain embodiments, a pH of the spent rinse water 118 may be adjusted to between approximately 6 and approximately 7.5 using HCl 130 and/or NaOH 134 (e.g., generated in the HCl and NaOH production system 66) before, after, or during mixing with the brine stream 30.

After rinsing, the resin may be treated with the HCl 130 to remove the hardness minerals from the resin, thereby generating a concentrated brine stream 120 and converting the resin from a calcium and magnesium form to a hydrogen form. For example, the proton (e.g., hydrogen) in the HCl 130 may replace the calcium and magnesium absorbed onto the resin during softening of the brine stream 30, thereby generating calcium chloride ($CaCl_2$) and magnesium chloride ($MgCl_2$), which may form a portion of the concentrated brine stream 120. Residual unreacted HCl 130 may be neutralized by treating the resin with the NaOH 134 (e.g., dilute NaOH having approximately 0.1 wt % NaOH). The resin may then be regenerated with additional NaOH 134 (e.g., concentrated NaOH having approximately 4 wt % NaOH), which converts the hydrogen form resin to a sodium form. The sodium form of the resin in the subsystems 98, 100, 104 enables softening of the brine stream 30 by exchanging the sodium in the resin with the divalent hardness ions (e.g., $Ca^{2+}$ and $Mg^{2+}$).

The concentrated brine stream 120 generated during treatment of the resin with the HCl 130 is fed to the mineral removal system 32 to recover the hardness minerals from the concentrated brine stream 120, thereby generating the gypsum 46, the magnesium hydroxide 54, the calcium chloride ($CaCl_2$), and other compounds (e.g., salt 50, bromine 58, and potash 62). For example, the mineral removal system 32 receives the concentrated brine stream 120 from one or more of the subsystems 98, 100, 104, and feeds the concentrated brine stream 120 to a magnesium hydroxide removal system 136. During operation, the magnesium hydroxide removal system 136 is configured to recover magnesium from the stream 120 in the form of magnesium hydroxide 54. The stream 120 may be treated with the NaOH 134 and/or oxidizing agents upstream of the magnesium hydroxide removal system 136. The oxidizing agents oxidize iron species $Fe^{2+}$ to $Fe^{3+}$ that may be present in the stream 120.

The NaOH 134 may be used to adjust a pH of the stream 120 to between approximately 5 and approximately 7, which enables formation and precipitation of ferric hydroxide ($Fe(OH)_3$). The ferric hydroxide may be removed by filtering the stream 120 through a second filter 140 before feeding to the magnesium hydroxide removal system 136.

A filtered brine stream 146 is then routed to the magnesium hydroxide removal system 136. While in the magnesium hydroxide removal system 136, the filtered brine stream is treated with the lime 44, or between approximately 7 wt % and approximately 12 wt % NaOH 134 produced in the HCl and NaOH production system 66. For example, the filtered brine stream may be treated with lime 44 when a $Ca/SO_4$ molar ratio in the filtered brine stream 146 is less than approximately 1. That is, when a concentration of $SO_4$ is more than a concentration of Ca in the filtered brine stream 146. In contrast, when the $Ca/SO_4$ molar ratio in the filtered brine stream 146 is greater than approximately 1, the filtered brine stream may be treated with the NaOH 134. The lime 44 or the NaOH 134 enables precipitation of $Mg(OH)_2$, thereby facilitating recovery of the $Mg(OH)_2$ 54 (between approximately 50 wt % to approximately 70 wt % $Mg(OH)_2$) from the stream 146. The $Mg(OH)_2$ 54 recovered may be sold as an industrial grade product. In certain embodiments, the filtered brine stream 146 may be fed to a gypsum removal system 148 instead of the magnesium hydroxide removal system 136.

Following magnesium recovery in the magnesium hydroxide removal system 136, an effluent brine stream 150 is directed to the gypsum removal system 148. The gypsum removal system 148 recovers the Ca and $SO_4$ from the effluent brine stream 150 to generate the gypsum 46. In embodiments in which the $Ca/SO_4$ ratio is greater than 1, the effluent brine stream 150 may be treated with the HCl 130 (between approximately 6 wt % and approximately 8 wt % HCl) to adjust a pH of the effluent brine stream 150 to between approximately 7 and approximately 8. At least a portion of the pH adjusted effluent brine stream 150 is then fed to an electrodialysis (ED) system 154. The ED system 154 extracts a portion of the calcium in the effluent brine stream 150, thereby generating calcium chloride ($CaCl_2$) brine 156 having between approximately 15 wt % and approximately 35 wt % $CaCl_2$. The $CaCl_2$ brine 156 may be made available as a commercial product. An ED diluate stream 158 containing the remaining calcium chloride is fed to the gypsum removal system 148 for removal of Ca and $SO_4$ to generate the gypsum 46.

The gypsum removal system 148 may include a mixer 160, a settler 162, and a third filter 164 that facilitate removal of the gypsum 46 from the brine stream (e.g., the ED diluate stream 158). In certain embodiments, the stream 158 may be treated with an oxidizing agent upstream of the gypsum removal system 148 to convert any residual arsenic in the stream 158 to arsenate. The Ca and $SO_4$ in the stream 158 react in the gypsum removal system 148 to precipitate the gypsum 46. In certain embodiments, approximately 50% to approximately 70% of the $SO_4$ is removed from the stream 158. The presence of gypsum seed crystals in the mixer 160 (e.g., a turbulent mixer) operating at a neutral pH (e.g., a pH of approximately 6 to approximately 8) may facilitate gypsum precipitation kinetics, thereby enabling rapid gypsum precipitation. The gypsum particles may form a suspension and, therefore, may be well mixed with the water. Accordingly, while in the mixer 160, the stream may be treated with a coagulant (e.g., ferric hydroxide ($Fe(OH)_3$) or any other suitable coagulant) to coagulate (clump) the gypsum particles, and facilitate separation of the gypsum particles from the water.

In addition to gypsum precipitation, insoluble calcium fluoride ($CaF_2$) may also precipitate in the mixer 160, thereby removing a substantial portion of the fluoride from the stream. As such, fluoride scaling in downstream systems (e.g., RO, ED, and/or ion separation systems) may be reduced. In the settler 162, the gypsum crystals settle, and the saturated near solids free solution is decanted off and filtered by the third filter 164 (e.g., a sand filter, a microfilter, an ultrafilter, a cartridge filter, and so forth) to remove residual gypsum particles. A small amount of softened salt brine 166 from a second ion separation system 168 (e.g., a weak acid cation (WAC) softener) may be recirculated to the settler overflow to increase gypsum solubility and to desaturate the brine stream, thereby reducing scaling in the third filter 164 and other downstream units. The settler bottoms may be routed to a hydroclone and the third filter 164 to wash (e.g., with desalinated product water) and concentrate the gypsum 46 into a saleable washed filter cake. In certain embodiments, the filter cake may include approximately 70 wt % to approximately 100 wt % gypsum 46. For example, the filter cake may include approximately 90 wt % gypsum 46. Thus, gypsum 46 is provided as an output 170 from the gypsum removal system 148. The fine solids overflow stream from the hydroclone is recycled to the mixer 160 as seed crystals. The filtrate from the third filter 164 is recirculated to the settler 162. In certain embodiments, filtrate from the third filter 164 and effluent from the settler 162 are treated with sodium bisulfate ($NaHSO_4$) to remove any residual oxidizing agent. For example, the $NaHSO_4$ may react with sodium hypochlorite to produce $SO_4$ and chloride.

The gypsum removal system 148 may remove approximately 60% to approximately 75% of the calcium received from the stream 158 as gypsum 46, and produce a NaCl brine stream 172. The NaCl brine stream 172 also includes the $SO_4$ and chloride generated during treatment of the filtrate from the third filter 164, and the effluent from the settler 162, which includes $NaHSO_4$. The NaCl brine stream 172 may also include residual magnesium and calcium that were not removed in the removal systems 136, 148. For example, the NaCl brine stream 172 may contain less than approximately 5-9 g/L (5,000-9,000 ppm) gypsum 46 and less than approximately 0.4 g/L (400 ppm) magnesium chloride. Therefore, the brine stream 172 may be fed to the second ion separation system 168 before routing to the HCl and NaOH production system 66 for use in production of HCl and NaOH. In certain embodiments, the brine stream 172 may be directed to an electrodialysis (ED) system upstream of the HCl and NaOH production system 66 to generate NaCl brine for use in the HCl and NaOH production system 66.

Similar to the first ion separation system 96, the second ion separation system 168 may include one or more softeners that remove the residual magnesium and calcium from the brine stream 172, thereby generating the softened salt brine 166. In this way, ion selective electrodialysis membranes generally used in ED systems may be replaced with more cost efficient non-selective electrodialysis membranes for the ED system downstream from the gypsum removal system 148. The second ion separation system 168 is treated with the HCl 130 and NaOH 134 to regenerate the resin, and a second concentrated brine stream 190 is produced and combined with the stream 146 to facilitate recovery of the residual calcium and magnesium removed in the second ion separation system 168.

The softened salt brine 166 and a purge sodium sulfate and sodium chloride stream 174 from the HCl and NaOH production system 66 may be directed to a nanofiltration (NF) system 176. The NF system 176 removes sulfate from the softened salt brine 166, and generates an NF permeate stream 178 (e.g., having less than approximately 40 g/L (40,000 ppm) NaCl) and a sodium chloride and sulfate brine stream 180. The sodium chloride and sulfate brine stream 180 may include between approximately 50 g/L (50,000 ppm) and approximately 70 g/L (70,000 ppm) total dissolved solids, which include Na, Cl and $SO_4$. Therefore, the sodium chloride and sulfate brine stream 180 may be directed to the gypsum removal system 148 to recover the $SO_4$ as the gypsum 46. In certain embodiments, the softened salt brine 166 may be combined with an RO non-permeate stream 184 upstream of the NF system 176. The streams 166, 174, 184 may be neutralized with the HCl 130 (between approximately 5 wt % and approximately 8 wt % HCl) and filtered through a fourth filter 188 (similar to the filters 116, 140) before being fed to the NF system 176. The fourth filter 188 may substantially block gypsum scale from passing to the NF system 176. In certain embodiments, a portion of the softened salt brine 166 is recirculated to the gypsum settler 162. The recirculated brine may desaturate effluent from the settler 162 and reduce gypsum scaling in the gypsum recovery system 148. The NF permeate stream 178 is fed to a secondary RO system which produces desalinated water and a concentrated (approximately 6 wt % and approximately 10 wt %) NaCl brine stream for HCl and NaOH production.

Figure 3A:
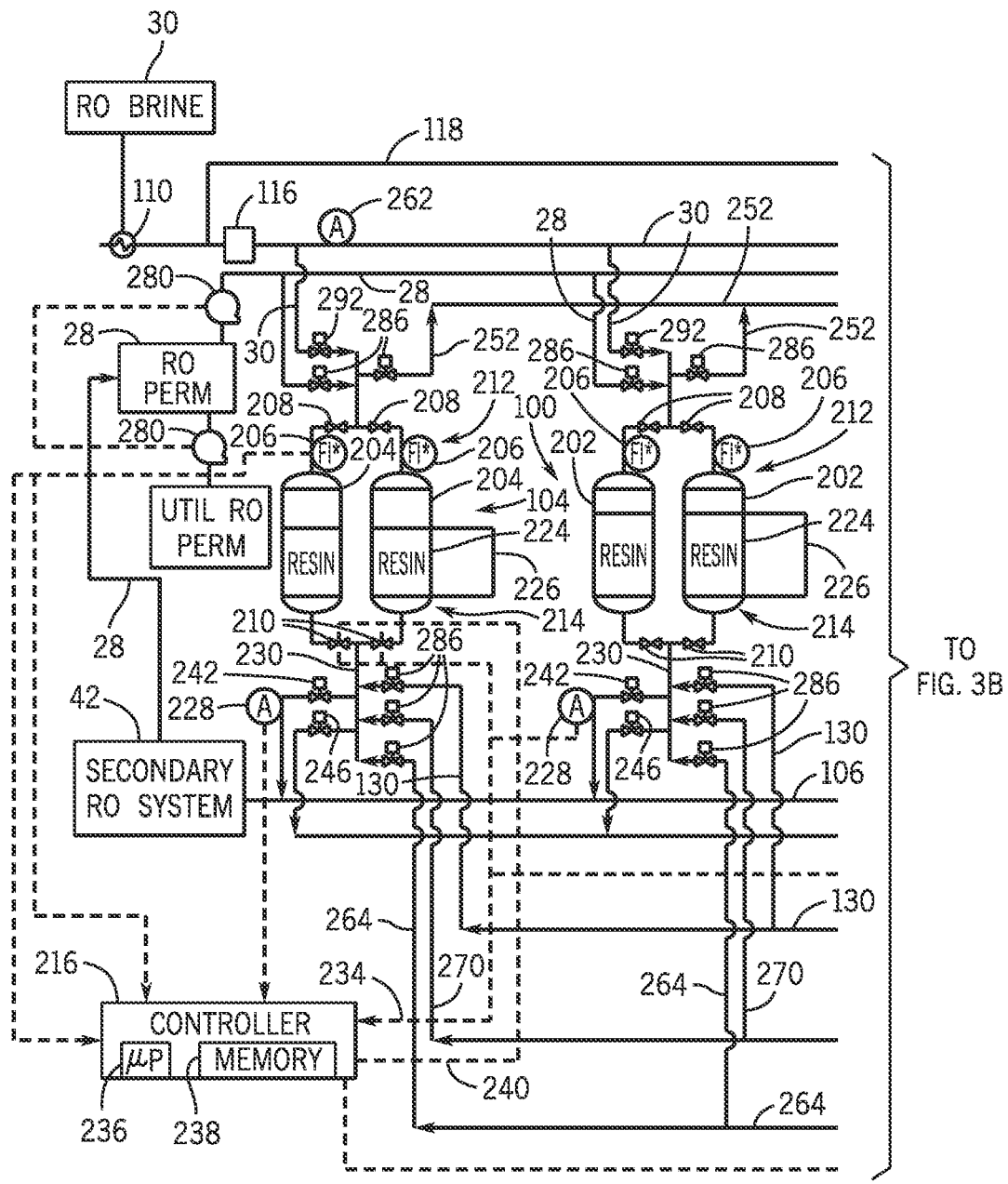
FIGS. 3A and 3B are block diagrams of an embodiment of the mineral removal system of FIG. 2 that includes a regeneration system for regenerating the array of ion exchange subsystems, in accordance with aspects of the present disclosure.
Figure 3B:
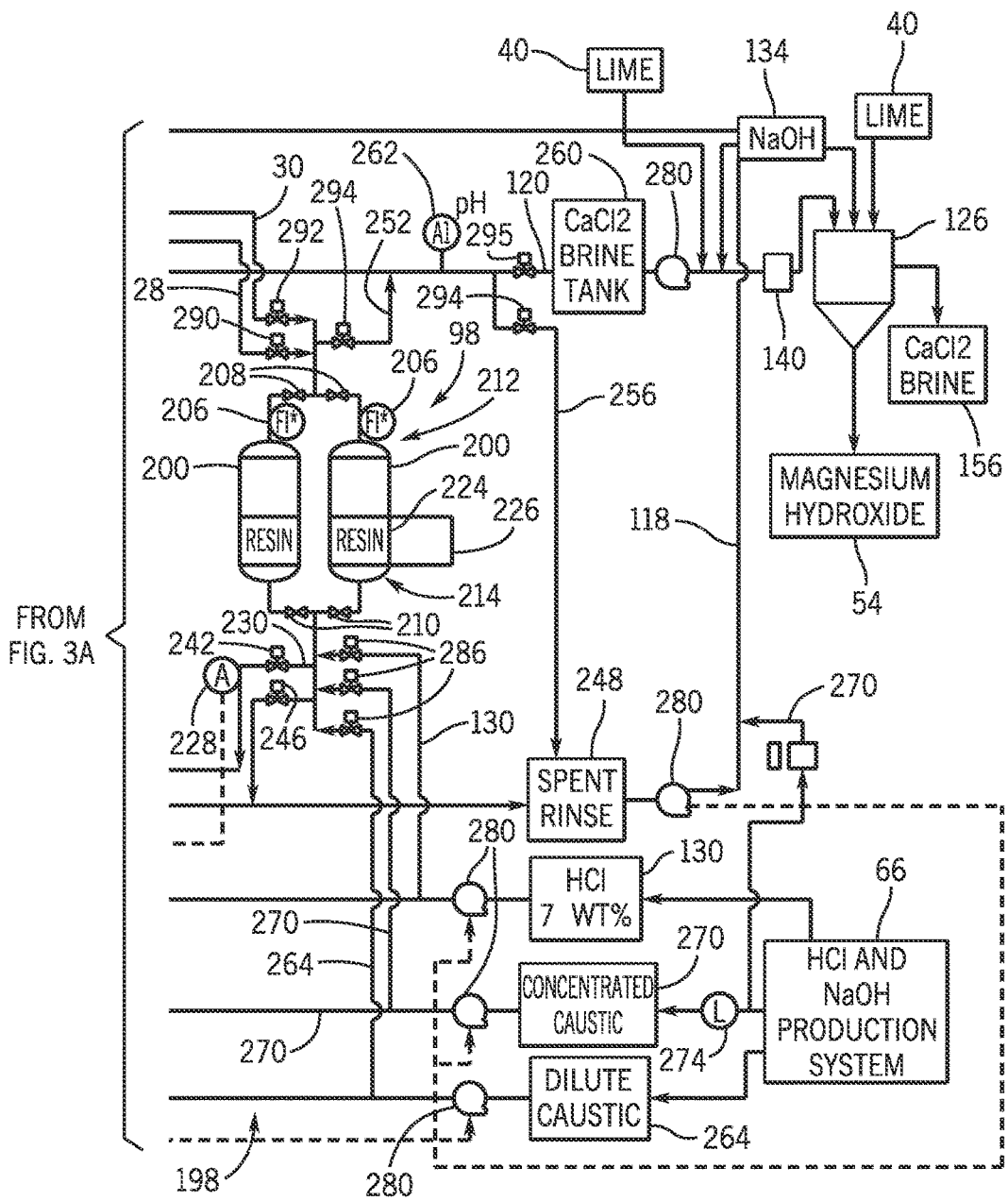

As discussed above, the streams generated as a result of resin regeneration may be recycled within the desalination system 10 and/or fed to the mineral removal system 32 to recover the hardness minerals for commercial use. In this way, waste streams that are generally associated with regeneration of the resin in the ion separation system 96 may be reduced or eliminated. As such, the overall operational and waste disposal costs for waste water treatment systems, such as the system 10, may be reduced. FIGS. 3A and 3B are block diagrams of an embodiment of an ion separation system 96, including the ion exchange subsystems 98, 100, 104 used to remove hardness minerals from the brine stream 30, and a resin regeneration system 198 for converting the resin from the calcium and magnesium form to the sodium form. In the illustrated embodiment, the ion exchange subsystems 98, 100, 104 each include two ion exchange softeners 200, 202, and 204, respectively. However, in alternate embodiments, the ion exchange subsystems 98, 100, 104 may include 1, 2, 3, 4, 5, or more softeners. The number of softeners within each respective subsystem 98, 100, 104 may be the same or different. For example, in the illustrated embodiment, each subsystem 98, 100, 104 may include two softeners 200, 202, 204, respectively. In other embodiments, one subsystem includes two softeners, and another subsystem may include a different number (e.g., 1, 3, 4, 5, etc.) of softeners.

The softeners 200, 202, 204 may be weak acid cation (WAC) ion exchange softeners (e.g., such as an Amberlite™ IRC747 softeners manufactured by The Dow Chemical Company of Midland, Mich.), in which a substantial portion (e.g., approximately greater than 99%) of hardness minerals in the brine stream 30 are removed. In the illustrated embodiment, the softeners 200, 202, 204 within the respective subsystems 98, 100, 104 are connected in parallel. However, in other embodiments, the softeners 200, 202, 204 may be connected in series. Each subsystem includes a bidirectional flow meter 206 and valves 208, 210 at each end 212, 214 of the subsystem. In the illustrated embodiment, the valves 208, 210 are controlled by a controller 216 (e.g., an electronic and/or processor-based controller) associated with the waste water system 10 and/or the ion separation system 96. In other embodiments, the valves 208, 210 may be controlled manually. The valves 208, 210 enable periodic adjustment of flows into and out of the ion exchange softeners 200, 202, 204, such that a flow of fluid through each ion exchange softener 200, 202, 204 is approximately the same (e.g., with a flow differential of less than approximately 1 percent). Additionally, the valves 208, 210 enable the softeners 200, 202, 204 to be individually deactivated for maintenance without complete shutdown of the waste water system 10, the mineral removal plant 34, and/or all of the subsystems 98, 100, 104. The ion separation system 96 may also include additional valves to control flow of streams (e.g., brine stream 30, desalinated water 28, spent rinse water 118, HCl 130, NaOH 134, concentrated brine stream 138, and/or any other suitable fluid stream) through the subsystems 98, 100, 104. The controller 216 may control the valves based on absorption and regeneration cycles of the softeners 200, 202, 204 of the respective ion exchange subsystems 98, 100, 104, as discussed in further detail below.

During operation of the ion separation system 96, the pre-heated brine stream 30 flows into the ion exchange softeners 200, 202, 204 of the respective subsystem 98, 100, 104. In certain embodiments, each softener 200, 202, 204 may be operated in absorption mode, and the brine stream 30 flows through each softener at the same time, e.g., the softeners 200, 202, 204 are operated in parallel. In other embodiments, at least one softener 200 202, 204 may be operated in regeneration mode while at least one other softener 200, 202, 204 is operated in absorption mode. In such embodiments, the brine stream 30 flows through the softeners 200, 202, 204 at different times. For example, in one embodiment, the subsystems 98, 100, 104 may be sequenced such that absorption cycles for each respective softener are separated by at least half of an absorption cycle (e.g., an absorption cycle is when an ion exchange softener is absorbing the hardness minerals and softening the brine stream 30) relative to another softener. By way of example, if the absorption cycle of the softeners are approximately 6 hours, the softener 202 completes its absorption cycle 3 hours after the absorption cycle for the softener 200 is complete, and the softener 204 completes its absorption cycle 3 hours after the absorption cycles of the softener 202 is complete, and 6 hours after the absorption cycle of the softener 200 is complete. By sequencing the softeners 200, 202, 204 based on their absorption cycles, the ion separation system 96 may have at least two softeners online for softening the brine stream 30 while one softener is regenerated. Additionally, any softener that has completed a regeneration cycle may initiate the absorption cycle when at least one of the other softeners is starting a regeneration cycle (e.g., a cycle that removes the hardness minerals from the resin of the softeners 200, 202, 204). In this way, the flows of the streams 30, 106 into and out of the ion separation system 96, respectively, may be uninterrupted during regeneration of the resin within the softeners 200, 202, 204.

An end of the absorption cycle for the softeners 200, 202, 204 may be determined based on an amount of hardness breakthrough (e.g., a concentration of hardness minerals above a threshold value) of the subsystem 98, 100, 104. For example, as discussed above, the subsystems 98, 100, 104 remove hardness minerals from the brine stream 30 to generate the softened NaCl brine 106. During softening of the brine stream 30, a resin 224 associated with each respective softener 200, 202, 204 may become saturated with hardness minerals. Therefore, an amount of the resin 224 available for softening of the brine stream 30 may decrease due to absorption of the hardness minerals into the resin 224, as shown by a resin level 226 associated with each softener 200, 202, 204. Accordingly, as the resin level 226 decreases (e.g., becomes loaded with hardness minerals), the amount of hardness breakthrough in the softened NaCl brine stream 106 may increase.

In the illustrated embodiment, sensors 228 (e.g., multiplexed online hardness sensors) are disposed along respective conduits 230 fluidly coupling each ion exchange subsystem 98, 100, 104 with the secondary RO system 42. The sensors 228 measure the hardness of the softened NaCl brine stream 106 as it flows from the ion exchange subsystem 98, 100, 104 to the secondary RO system 42, thereby monitoring the hardness breakthrough from each respective subsystem 98, 100, 104. Each sensors 228 sends a respective signal 234 representative of the hardness of the softened NaCl brine stream 106 to the controller 216. The controller 216 includes a processor (e.g., microprocessor 236) that determines an amount of hardness in the softened NaCl brine stream 106 from each subsystem based on the respective signals 23. The processor also determines whether the hardness of each softened NaCl brine stream 106 is within a desired threshold range. For example, the controller 216 includes a memory 238 that may store hardness threshold values indicative of maximum hardness levels suitable for the secondary RO system 42 and/or for other downstream membranes (e.g., NF and ED system membranes). If the hardness of the softened NaCl brine stream 106 from a respective subsystem exceeds the threshold value (e.g., is outside of a threshold range), the controller 216 provides a second signal 240 to a valve 242 the respective subsystem indicating that the resin 224 in the respective softener 200, 202, 204, is saturated with hardness minerals (e.g., calcium and magnesium) and the absorption cycle for the softener 200, 202, 212 is at or near the end instructing the valve 242 to close and the valve 246 to open. By way of example, the maximum hardness threshold value (e.g., for providing a suitable brine to the secondary RO system 42) may be between approximately 200 milligrams/liter (mg/L) and approximately 500 mg/L calcium hardness. The controller 216 may store the hardness breakthrough measurements associated with absorption cycle times for each of the softeners 200, 202, 204. The controller 216 may also adjust the absorption cycle times for the softeners 200, 202, 204 such that the resin 224 may be saturated with hardness minerals without exceeding the maximum hardness threshold value (e.g., the maximum suitable hardness breakthrough for the secondary RO system 42).

At the end of the absorption cycle, the softener is regenerated to remove the hardness minerals from the resin 224. While the following discussion relates to the regeneration cycle of the softener 200 of the subsystem 98, it should be appreciated that the softeners 202 and 204 are regenerated in a similar manner. Once the resin 224 of the softener 200 is saturated with the hardness minerals, a valve 242 is closed to block a flow of the softened NaCl brine stream 106 to the secondary RO system 42, and a valve 246 is opened to allow the softened NaCl brine 106 remaining in the softener 200 to flow into a spent rinse tank 248. In certain embodiments, for example, if the resin 224 is not saturated, the brine stream may continue to flow (e.g., in a downflow direction) through the softener 200 to cause the resin 224 to become saturated with the hardness minerals. For example, in certain embodiments, the softened NaCl brine stream 106 may exceed the hardness threshold value before the resin 224 is saturated. Therefore, by continuing to flow the brine stream through the softener 200 after the valve 242 is closed, the resin 224 becomes saturated with the hardness minerals. In this way, during treatment of the resin 224 with the HCl 130, a substantial portion of the resin 224 may be converted into the hydrogen form. As such a substantial portion of the calcium and magnesium is removed from the resin. The hydrogen form of the resin reacts with NaOH to produce the sodium form of the resin. Thus the conversion of the resin first to the sodium form facilitates regeneration of the resin 224 with caustic (e.g., NaOH 134) to generate the sodium form.

The brine stream and/or the softened NaCl brine stream may be displaced from the softener 200 (e.g., flushed out of) with the desalinated water 28 (e.g., produced by the secondary RO system 28 and/or the RO system 20). By rinsing the resin 224 with the desalinated water 28, sulfate, bicarbonate, and other non-chlorine anions that may be present in the brine stream (e.g., RO permeate) may be removed from the softener 200 before treating the resin 224 with the HCl 130 to generate the concentrated brine stream 120. In this way, the $CaCl_2$ and $MgCl_2$ brine product (e.g., from the concentrated brine stream 120) fed to the a $CaCl_2$ brine tank (e.g., the $CaCl_2$ brine tank 260) may not be contaminated with the non-chlorine anions, thereby generating $CaCl_2$ and $Mg(OH)_2$ commercial products (e.g., the $CaCl_2$ 138 and $Mg(OH)_2$ 54) having a desirable purity.

Following rinsing of the resin 224, the valve 246 is closed and a valve 286 is opened to enable a flow of HCl 130 and/or caustic into the respective softener. For example, the HCl 130 (e.g., approximately 7 wt % HCl) may be fed to the softener 200 through the softener discharge end 214 (e.g., the end of the softener that discharges the softened NaCl brine stream 106). The HCl 130 may release the resin 224, and convert the resin 224 from the calcium and magnesium form to the hydrogen form, thereby producing a softener effluent 252 that may include $CaCl_2$ and $MgCl_2$. Before feeding the softener effluent 252 to the magnesium hydroxide removal system 136, at least one softener bed volume (e.g., total softener volume) of the HCl 130 is fed to the softener 200. A valve 294 is opened, such that the softener effluent 252 is routed to the spent rinse tank 248, as illustrated by arrow 256. This process enables displacement of the desalinated water 28 and removal of any residual sulfate, bicarbonate, non-chlorine anions, silica, and/or any other undesirable components that may remain within the softener 200 after rinsing with the desalinated water 28. After flowing at least one bed volume of the HCl 130 through the softener 200, the resin 224 may soak in the HCl 130 for between approximately 1 minute and approximately 60 minutes. Soaking the resin 224 in the HCl 130 converts the resin from the calcium and magnesium form to the hydrogen form. The resin 224 may go through several soak cycles, each soak cycle being longer than a previous soak cycle. For example, in certain embodiments, the resin 224 may initially soak in the HCl 130 for approximately 5 minutes. The softener effluent 252 generated from the initial soak may be routed to the spent rinse tank 248 to remove any residual non-chlorine anions and other undesirable components before opening a valve 295 and feeding the softener effluent 252 to a $CaCl_2$ brine tank 260, and subsequently to the magnesium hydroxide production system 136 to produce the magnesium hydroxide 54 and the $CaCl_2$ brine 156 having a suitable purity for commercial use.

Additional volumes of the HCl 130 may be fed to the softener 200 with increasing soak times until a stoichiometric volume of HCl has been added to the softener 200. By adding a stoichiometric volume of HCl to the softener 200, a substantial portion of the calcium and magnesium may be removed from the resin 224. As such, a substantial portion of the resin 224 (e.g., approximately 99 percent) may be converted to the hydrogen form. The softener effluent 252 produced from the additional volumes of HCl may be a concentrated mixture of $CaCl_2$ and $MgCl_2$ (e.g., forming the concentrated brine stream 120). Therefore, the softener effluent 252 may be fed to the $CaCl_2$ brine tank 260 and the magnesium hydroxide removal system 126. A sensor 262 may monitor a pH of the concentrated brine stream 120 before feeding to the $CaCl_2$ brine tank 260. The pH of the concentrated brine 120 may be adjusted, if necessary, before, during, or after feeding to the $CaCl_2$ brine tank 260

Once a final volume of HCl has been fed to the softener 200 to convert the resin 224 into the hydrogen form, dilute caustic 264 (e.g., between 0.05 wt % and approximately 0.1 wt % NaOH) is fed to the softener 200 through the softener discharge end 214. For example, between approximately 1 and approximately 2 volume beds of the dilute caustic 264 may be fed in an upstream direction to the softener 200 (e.g., upstream relative to a flow of the brine stream 30 through the softeners. The dilute caustic 264 displaces and routes the softener effluent 252 (e.g., concentrated $CaCl_2$ and $MgCl_2$) from the softener 200 to the $CaCl_2$ brine tank 260. In certain embodiments, an additional volume of dilute caustic 264 (e.g., between approximately 1 and approximately 2 volume beds) may be fed to the softener 200 to remove residual $CaCl_2$ and $MgCl_2$, and to neutralize any residual HCl in the softener 200. The sensor 262 monitors a pH of the softener effluent 252. The majority (>approximately 90%) of the hardness is contained in the spent hydrochloric acid (pH between approximately 1 and approximately 2) in the form of $CaCl_2$ and $MgCl_2$. The rinse water has only residual (<approximately 10%) of the hardness in the form of $CaCl_2$ and $MgCl_2$ and has a pH>approximately 2. Thus monitoring the softener effluent pH allows the proper routing of the softener effluent to the $CaCl_2$ brine tank or the spent rinse tank. The softener effluent 252 from the additional rinse with the dilute caustic 264 may be a dilute mixture of $CaCl_2$, $MgCl_2$, and NaCl (e.g., from neutralization of the HCl). The dilute mixture may dilute the concentrated brine stream 120, and the NaCl in the dilute mixture may reduce the purity of concentrated brine stream 120 in the $CaCl_2$ tank 260. Therefore, the valve 295 is closed and the valve 294 is opened to direct a flow of the softener effluent 252 from the additional caustic rinse to the spent rinse tank 248.

Following conversion of the resin 224 from the calcium and magnesium form to the hydrogen form and displacement of the concentrated brine stream 120, the resin 224 is treated with concentrated caustic 270 (e.g., approximately 4 wt % NaOH) to regenerate the resin 224. For example, at least one bed volume of the concentrated caustic 270 may be fed to the softener 200 in an upstream direction (e.g., upstream relative to a flow of the brine stream 30 through the softeners) through the softener discharge end 214. The concentrated caustic 270 converts the hydrogen form of the resin 224 to the sodium form. As discussed above, the sodium form of the resin 224 enables absorption of the hardness minerals (e.g., calcium and magnesium) from the brine stream 30. Generally, addition of caustic to the softener 200 increases a temperature of the resin 224 due, in part, to the exothermic reaction between the hydrogen on the resin and the hydroxide in the NaOH. Therefore, the concentration of the concentrated caustic 270 may be selected to be approximately 4 wt % NaOH to control the temperature of the resin 224.

The softener effluent 252 produced from the conversion of the hydrogen form to the sodium form of the resin 224 may be between approximately 10 degrees and approximately 25 degrees hotter than the concentrated caustic 270 flowing from the resin regeneration system 198 to the softener 200. Therefore, the concentrated caustic 270 may be cooled upstream of the resin regeneration system 198 to between approximately 24° C. and approximately 38° C. (approximately 75° F. and approximately 100° F.). This cooling reduces the temperature of the resin 224, valves, and piping components associated with the ion separation system 96 and/or mineral removal plant 34.

Similar to treatment with the HCl the resin 224 may be allowed to soak in the concentrated caustic 270 to enable the resin 224 to fully or partially convert from the hydrogen form to the sodium form. In certain embodiments, the resin 224 may soak for between approximately 15 minutes to approximately 60 minutes. Furthermore, certain embodiments, stoichiometric amounts of the concentrated caustic 270 may be used to convert the resin 224 from the hydrogen form to the sodium form. In other embodiments, an amount of the concentrated caustic 270 used to convert the hydrogen form to the sodium form is between approximately 80 percent and approximately 90 percent of the stoichiometric amount. Reducing the quantity of caustic may enable at least a portion of the resin 224 to remain in the hydrogen form, which may react with bicarbonate present in the brine stream 30. Reaction of the hydrogen form of the resin 224 with the bicarbonate in the brines stream 30 may decrease a pH of the softened NaCl brine stream 106 to between approximately 6.0 and approximately 7.0, thereby increasing solubility of carbonates in the softened NaCl brine stream 106 and reducing carbonate scaling in the secondary RO system 42 and/or downstream components (e.g., NF and ED systems).

After regeneration of the resin 224, the resin 224 may be rinsed with the dilute caustic 264 to remove any residual concentrated caustic 270 from the softener 200. The softener effluent 252 is routed to the spent rinse tank 248 and recirculated through the ion separation system 96, as shown by arrow 118. A sensor 228 monitors a pH of the recirculated spent rinse water 118 before the spent rinse water 118 is mixed with the brine stream 30. The HCl 130 and/or the NaOH 134 may be added to the spent rinse water 118 to adjust the pH between approximately 6.5 and approximately 7. Flowing the dilute caustic 264 through the regenerated resin 224 maintains a residual level of caustic in the softener 200, thereby enabling additional conversion of the resin 224 from the hydrogen form to the sodium form. Additionally, the dilute caustic 264 reduces localized areas of residual concentrated caustic 270, which may cause magnesium hydroxide and/or calcium carbonate precipitation.

The desalinated water 28 may be fed to the softener 200 in a down flow direction through a softener inlet portion 212 to seat the resin 224 and rinse any dilute caustic from the resin 224, thereby generating additional spent rinse water 118. The spent rinse water 118 resulting from the desalinated water rinse is fed to the spent rinse tank 248 and recirculated through the ion separation system 96, as discussed above. Following rinsing of the regenerated resin 224 with the desalinated water 28, the ion exchange subsystem 98 remains in a standby mode until at least one other subsystem 100, 104 completes its absorption cycle and enters the regeneration cycle.

As discussed above, the controller 216 may control operation of the wastewater treatment system 10 (e.g., the ion separation system 96). The controller 216 may independently control operation of the ion separation system 96 by communicating with sensors (e.g., the flow sensor 206, the sensors 228, 295, etc.), control valves (e.g., valves 208, 210, 242, and 246), and pumps (e.g., pumps 280), and/or other flow monitoring and/or adjusting features throughout the ion separation system 96. The controller 216 may include a distributed control system (DCS) or any computer-based workstation that is fully or partially automated. For example, the controller 216 can be any device employing a general purpose or an application-specific processor (e.g., the microprocessor 236), both of which may generally include memory circuitry (e.g., the memory 238) for storing instructions, such as instructions for controlling absorption and regeneration cycles (e.g., cycle times, soak times, etc.) for each subsystem 98, 100, 104, instructions for controlling fluid flow rates, and/or instructions for controlling other suitable system parameters. The microprocessor 236 may include one or more processing devices, and the memory circuitry 238 may include one or more tangible, non-transitory, machine-readable media collectively storing instructions executable by the processor to perform the acts of FIG. 4, as discussed below, and control actions described herein.

In one embodiment, the controller 216 may operate flow control devices (e.g., valves, pumps, etc.) to control flows between different system components. It should be noted that there may be additional valves throughout the system 10 used to adjust different flows between the system components. In the illustrated embodiment, the controller 216 controls operation of various flow control device, such as the valves 208, 210, 242, and 246, thereby controlling flow of the brine stream 30, the desalinated water 28, the softened NaCl brine stream 106, the HCl 130, the caustic 264, 270, and the softener effluent 252, among other fluid streams through the subsystems 98, 100, 104 and/or the resin regeneration system 198 (e.g., based on the hardness breakthrough and/or absorption/regeneration cycle stage of the softeners 98, 100, 104). For example, during the absorption cycle, the controller 216 may provide instructions to close the valves 246, 286, 290 and open the valve 242, 292 such that the softened NaCl brine 106 flows into the secondary reverse osmosis system 42. In addition, with the valves 246, 286, 290 closed the HCl 130, the caustic 264, 270 from the resin regeneration system 198, and the desalinated water 28 from the secondary RO system 42 into the softener 200 is blocked.

Conversely, during the regeneration cycle, the controller 216 may provide instructions to close valves 242, 292 to block a flow of the stream 30 into the subsystems 96, 100, 104, and to block a flow of the steam 106 into the secondary RO system 42, respectively. Additionally, the controller 216 may also provide instructions to selectively open valves 246, 286, 290, 295 based on the regeneration cycle stage (e.g., desalinated water rinse, HCl soak, caustic rinse, etc.) of the softener to selectively enable a flow of the desalinated water 28, the HCl 130, and caustic 264, 270 through the ion separation system components (e.g., the subsystems 98, 100, 104, the spent rinse tank 248, etc.). In addition, the controller 216 may provide instructions to open and/or close valves 294 to control flow of the softener effluent brine 252 from the softeners 98, 100, 104 to the tanks 248, 260.

In certain embodiments, the controller 216 may control operation of the valves 208, 210 to control flow of the fluids (e.g., the streams 30, 106, 252 the HCl 130, the caustic 264, 270, etc) into and out of each softener 200, 202, 204 within the respective subsystems 98, 100, 104. In other embodiments, the valves 208, 210 may be adjusted manually. The valves 208, 210 for each respective softener 200, 202, 204 may be independently controlled (e.g., automatically or manually) to enable independently servicing each softener 200, 202, 204 within the respective subsystem 98, 100, 104 without deactivating the subsystem 98, 100, 104. That is, at least one softener 200, 202, 204 within the subsystem 98, 100, 104 may be operational throughout the absorption and/or regeneration cycle of the subsystem 98, 100, 104.

Figure 4:
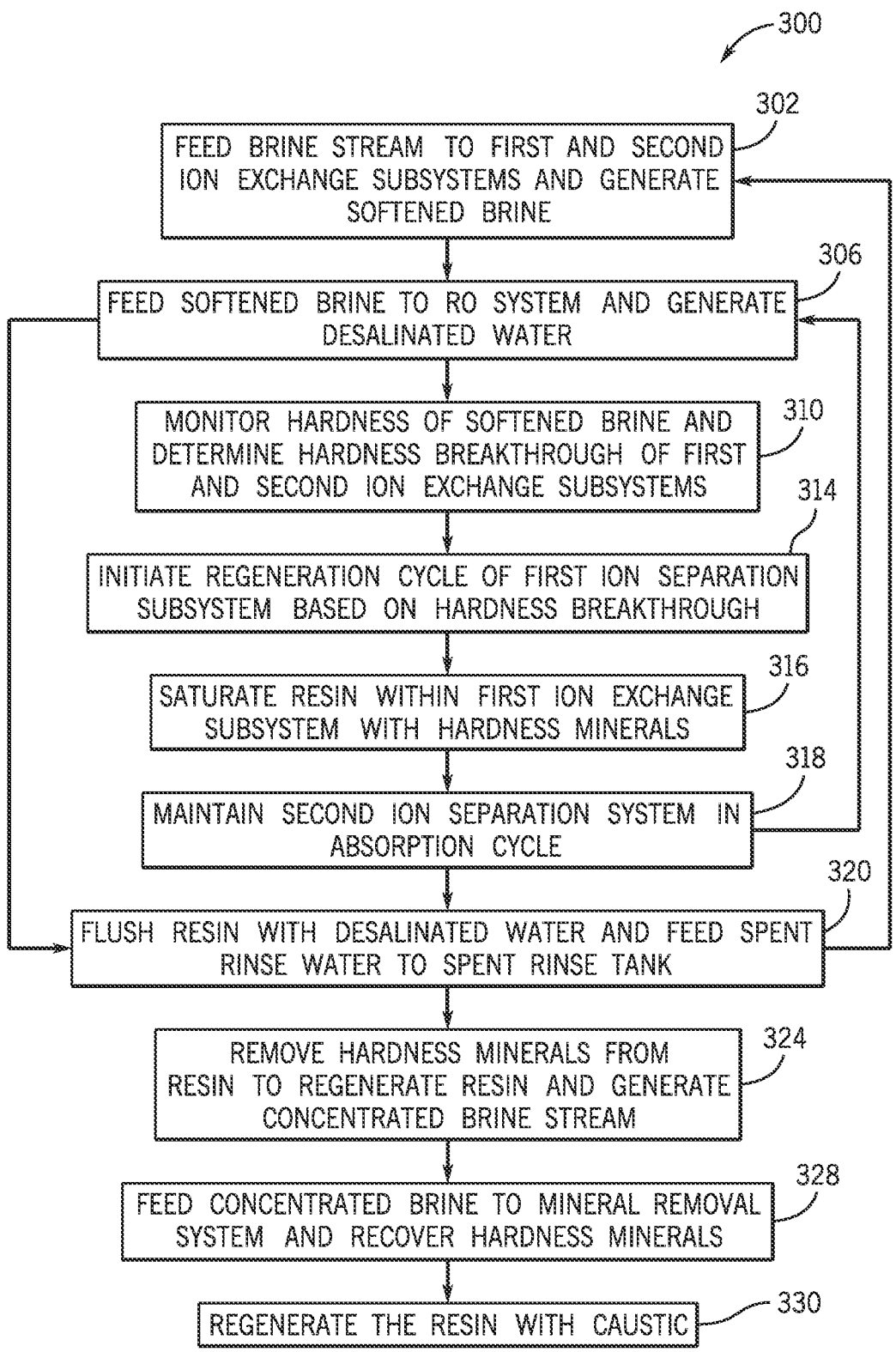
FIG. 4 is a flow diagram of a method for regenerating the array of ion exchange subsystems using the regeneration system of FIGS. 3A and 3B, in accordance with aspects of the present disclosure.

Present embodiments also include a method for regenerating the softeners 200, 202, 204 within the subsystems 98, 100, 104 and recovering the hardness minerals from the resin 224 without generating a waste stream. FIG. 4 is a flow diagram of a method 300 for regenerating the softeners 200, 202, 204 without producing a waste stream. To facilitate discussion of the regeneration process in the method 300, reference will only be made to regeneration of the resin 226 in the subsystem 98. However, it should be appreciated that the resin 226 of the subsystems 100, 104 are regenerated in a similar manner. The method 300 includes feeding the brine stream 30 to the ion separation system 96 and generating the softened NaCl brine stream 106 (block 302). As discussed above, with reference to FIGS. 3A and 3B, the brine stream 30 is fed to the subsystem 98, which includes the softener 200. The softener 200 includes the resin 226, which absorbs the hardness minerals by exchanging sodium ions with hardness ions (e.g., divalent ions such as $Ca^{2+}$ and $Mg^{2+}$), thereby converting the resin 226 from the sodium form to the calcium and magnesium form, and generating the softened NaCl brine stream 106. The method 300 also includes feeding the softened NaCl brine stream 106 to the secondary RO system to generate the desalinated water 28 (block 306).

While the softened NaCl brine stream 106 is flowing from the subsystem 98 to the secondary RO system 42, a hardness of the softened NaCl brine stream 106 is measured. Accordingly, the method 300 includes monitoring the hardness of the softened NaCl brine stream 106 to determine the hardness breakthrough of the subsystem 98 (block 310). For example, as the sodium form of the resin 226 decreases (e.g., converts to the calcium and magnesium form), absorption of the calcium and magnesium into the resin 226 decreases. As such, the amount of hardness minerals removed from the brine stream decreases, resulting in an increase in the hardness of the softened NaCl brine stream 106. Once the hardness of the softened NaCl brine stream 106 is above a threshold value (e.g., a maximum suitable hardness for the secondary RO system 42), the controller 216 instructs the subsystem 98 to initiate the regeneration cycle.

The method 300 further includes initiating the regeneration cycle of the subsystem 98 based on the hardness breakthrough (block 314) of the subsystem 98, and saturating the resin 226 within the ion exchange subsystem 98 with the hardness minerals (block 316). For example, when the hardness breakthrough of the subsystem 98 is at the hardness threshold value, the resin 226 may be saturated or nearly saturated with the hardness minerals. As a result, the softener may be unable to remove a desirable quantity of the hardness minerals from the brine stream. Therefore, the resin 224 may be regenerated to remove the hardness minerals from the resin. In certain embodiments, the hardness threshold value may be reached before the resin 224 is saturated with the hardness minerals. As such, the brine stream 30 may continue to flow through the subsystem 98 to saturate the resin 226 with the hardness minerals. During the saturation process, flow of the softened brine 106 to the secondary RO system 42 is blocked, and the effluent brine is fed to the spent rinse tank 248 for recirculation through the ion separation system 96.

The method 300 also includes at least one of the other subsystems 100, 104 in the absorption cycle (block 318), while the subsystem 98 is in the regeneration cycle, to continue generating the softened NaCl brine stream 106. As discussed above, the subsystems 98, 100, 104 are sequenced such that the absorption and regeneration cycles for the subsystems 98, 100, 104 occur at a different time. For example, the absorption cycle from the subsystem 98 may be separated from the absorption cycle from the subsystem 100 by half an absorption cycle. Similarly, the absorption cycle from the subsystem 104 may be separated by half an absorption cycle from the subsystem 100, and a complete absorption cycle of the subsystem 98. In this way, at least one subsystem 98, 100, 104 may be in the absorption cycle and generate the softened NaCl brine stream 106, and at least one other subsystem 98, 100, 104 may be in the regeneration cycle at any given time during softening of the brine stream 30.

The method 300 further includes flushing the resin 224 in the subsystem 98 with the desalinated water 28 from the secondary RO system 42, and feeding the spent rinse water 118 to the spent rinse tank 248 (block 320). For example, in certain embodiments, the desalinated water 28 (e.g., RO permeate) produced by the secondary RO system 42 may be fed to the subsystem 98 to displace brine remaining in the softener that may otherwise contaminate the hardness minerals during regeneration of the resin 224. The spent rinse water 118 may contain hardness minerals that were not removed by the subsystem 98. Therefore, the spent rinse water 118 may be recirculated through the ion separation system 96 to recover the hardness minerals. In this way, the subsystem 98 does not generate a waste stream and enables the mineral removal system 32 to recover approximately 99 percent of the hardness minerals from the brine stream 30.

The method 300 also includes removing the hardness minerals from the resin 224 to regenerate the resin 224, and to generate the concentrated brine stream 120 (block 324). For example, as discussed above with reference to FIGS. 3A and 3B, the resin 224 may be treated with the HCl 130 to remove the hardness minerals from the resin 224 and to convert the resin 224 from the calcium and magnesium form to the hydrogen form. The concentrated brine stream 120 may be fed to the mineral removal system 32 to recover the hardness minerals and to generate $CaCl_2$ and $Mg(OH)_2$ products for commercial use (block 328), as discussed above with reference to FIG. 2.

Following treatment with the HCl 130 and recovery of the hardness minerals, in accordance with blocks 324 and 328, the resin 224 may be treated with the caustic 264, 270 to regenerate the resin 224 (block 330). The caustic may neutralize any residual HCl remaining in the subsystem 98 and convert the resin from the hydrogen form to the sodium form, thereby regenerating the resin 224. Once the regeneration cycle for the resin 224 in the subsystem 98 is complete, the subsystem 98 may be operated in absorption mode and at least one of the subsystems 100, 104 may be operated in regeneration mode, according to the method 300.

As described above, certain embodiments of the desalination system 10 include ion separation subsystems (e.g., the ion exchange subsystems 98, 100, 104) that use ion exchange softeners (e.g., the softeners 200, 202, 204) to generate softener effluent streams (e.g., stream 106), which are used to produce desalinated water (e.g., the desalinated water 28), by removing the hardness minerals from a brine stream (e.g., the brine stream 30). Once the softened effluent (e.g., the softened NaCl brine stream 106) reaches a hardness threshold value, the absorption cycle of the softener is terminated and the regeneration cycle for the softener begins. A resin regeneration system may treat the softener resin with HCl to release the hardness minerals from the softener, which are used to produce a concentrated $CaCl_2$ and $MgCl_2$ brine stream (e.g., the concentrated brine stream 120). The concentrated brine stream may be fed to a mineral recovery system to recover the hardness minerals as commercial products. Softener rinse streams may be recirculated through the ion separation subsystems to recover any hardness minerals that may be in the spent rinse streams. In this way, waste from the softeners may be reduced or eliminated. The softeners associated with each ion exchange subsystem may be sequenced such that initiation times for each ion exchange subsystem are separated by at least half an absorption cycle relative to another subsystem. As such, at least one ion exchange subsystem within the system 10 may operate in absorption mode, and at least one subsystem may operate in regeneration mode. Therefore, production of the softened NaCl brine stream may be continuous and uninterrupted. In addition, by having at least on subsystem in absorption mode and another subsystem in regeneration mode, desalinated water generated from the softened effluent (e.g., in the secondary RO system 42) may be used in the resin regeneration system to rinse the softeners.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:

an ion separation unit comprising an ion exchange resin configured to absorb hardness minerals from a brine stream, wherein the ion separation unit is configured to generate a softened water stream and a concentrated hardness mineral stream;

a reverse osmosis system downstream from and fluidly coupled to the ion separation unit, wherein the reverse osmosis system is configured to receive the softened water stream and to generate a softened RO permeate;

a resin regeneration system fluidly coupled to the ion separation unit and configured to supply a fluid to the ion separation unit, wherein the fluid releases the hardness minerals from the ion exchange resin and replaces the hardness minerals with monovalent cations; and a controller comprising one or more tangible, non-transitory, machine-readable media collectively storing one or more sets of instructions, and one or more processing devices configured to execute the one or more sets of instructions to monitor, control, or a combination thereof, operation of the system, wherein the one or more sets of instructions are configured to cause the one or more processing devices to:
monitor a hardness of the softened water stream
direct at least a portion of the softened RO permeate to the ion separation unit upon detection of the softened water stream reaching a hardness limit; and
regenerate the ion exchange resin after directing the portion of the softened RO permeate to the ion separation unit, wherein regenerating the ion exchange resin comprises supplying the fluid from the resin regeneration system to the ion separation unit to release the hardness minerals from the ion exchange resin and replace the hardness minerals with the monovalent cations.

2. The system of claim 1, wherein the ion separation unit comprises a plurality of ion separation subsystems, and each ion separation subsystem comprises the ion exchange resin.

3. The system of claim 2, wherein each ion separation subsystem of the plurality of ion separation subsystems is configured to operate in parallel relative to another ion separation subsystem of the plurality of ion separation subsystems.

4. The system of claim 1, wherein the resin regeneration system is configured to supply the fluid to the ion separation unit in a direction opposite a flow direction of the softened water stream from the ion separation unit.

5. The system of claim 1, comprising a mineral removal system disposed downstream from and fluidly coupled to the ion separation unit, wherein the ion separation unit is configured to provide the concentrated hardness mineral stream to the mineral removal system via an outlet, and the outlet is configured to flow the concentrated hardness mineral stream in a direction opposite a flow direction of the brine stream and the softened water stream.

6. The system of claim 1, wherein the hardness limit is between approximately 100 to 600 ppm.

7. The system of claim 1, wherein the hardness minerals comprise calcium and magnesium.

8. A system, comprising:
an ion separation unit comprising a plurality of ion exchange subsystems, wherein each ion exchange subsystem of the plurality of ion exchange subsystems comprises an ion exchange resin configured to absorb hardness minerals from a brine stream, wherein the ion separation unit is configured to generate a softened water stream and a concentrated mineral stream comprising the hardness minerals; and
a controller comprising one or more tangible, non-transitory, machine-readable media collectively storing one or more sets of instructions, and one or more processing devices configured to execute the one or more sets of instructions to monitor, control, or a combination thereof, operation of the system, wherein the one or more sets of instructions are configured to cause the one or more processing devices to:
monitor a hardness of the softened water stream; and
control resin regeneration based on the hardness of the softened water stream, wherein the resin regeneration comprises directing a reverse osmosis (RO) permeate to at least one ion exchange subsystem of the plurality of ion exchange subsystems upon detection of the hardness of the softened water stream exceeding a hardness threshold and releasing the hardness minerals from the ion exchange resin after directing the portion of the RO permeate to the at least one ion exchange subsystem of the plurality of ion exchange subsystems.

9. The system of claim 8, comprising an RO system disposed downstream from and fluidly couple to the ion separation unit, wherein the RO system is configured to generate the RO permeate from the softened water stream and to flow the RO permeate to the at least one ion exchange subsystem of the plurality of ion exchange subsystems.

10. The system of claim 9, wherein the one or more sets of instructions are configured to use the one or more processing devices to sequence the plurality of ion exchange subsystems such that while a at least one ion exchange subsystem of the plurality of ion exchange subsystems is in a regeneration cycle, the remaining ion exchange subsystems of the plurality of ion exchange subsystems are in an absorption cycle, wherein the remaining ion exchange subsystems of the plurality of ion exchange subsystems continue to generate the softened brine used to produce the RO permeate, and wherein the plurality of ion exchange subsystems are in the regeneration cycle while converting the ion exchange resin from a calcium and magnesium form to a sodium form.

11. The system of claim 9, wherein the plurality of ion exchange subsystems are sequenced such that each subsystem is separated by half an absorption cycle, wherein the plurality of ion exchange subsystems are in the absorption cycle while converting the ion exchange resin from a sodium form to a calcium and magnesium form.

12. A system, comprising:
an ion separation unit comprising an ion exchange resin configured to absorb hardness minerals from a brine stream, wherein the ion separation unit is configured to generate a softened water stream and a concentrated hardness mineral stream;
a mineral removal system disposed downstream from and fluidly coupled to the ion separation unit, wherein the ion separation unit is configured to provide the concentrated hardness mineral stream to the mineral removal system via an outlet;
a reverse osmosis (RO) system downstream from and fluidly coupled to the ion separation unit, wherein the RO system is configured to receive the softened water stream and to generate a softened RO permeate;
a resin regeneration system fluidly coupled to the ion separation unit and configured to supply a fluid to the ion separation unit, wherein the fluid releases the hardness minerals from the ion exchange resin and replaces the hardness minerals with monovalent cations; and
a controller comprising one or more tangible, non-transitory, machine-readable media collectively storing one or more sets of instructions, and one or more processing devices configured to execute the one or more sets of instructions to monitor, control, or a combination thereof, operation of the system, wherein the one or more sets of instructions are configured to cause the one or more processing devices to:
monitor a hardness of the softened water stream and to control regeneration of the ion exchange resin based on the hardness of the softened water stream; and
direct at least a portion of the softened RO permeate to the ion separation unit upon detection of the softened water stream reaching a hardness limit.

13. The system of claim 12, wherein the one or more sets of instructions are configured to use the one or more processing devices to regenerate the ion exchange resin after directing the portion of the softened RO permeate to the ion separation unit, wherein regenerating the ion exchange resin comprises releasing the hardness minerals from the ion exchange resin and replacing the hardness minerals with the monovalent cations.

14. The system of claim 12, wherein the ion separation unit comprises a plurality of ion separation subsystems, and each ion separation subsystem comprises the ion exchange resin.

15. The system of claim 14, wherein each ion separation subsystem of the plurality of ion separation subsystems is configured to operate in parallel relative to another ion separation subsystem of the plurality of ion separation subsystems.

16. The system of claim 14, wherein the one or more sets of instructions are configured to use the one or more processing devices to sequence the plurality of ion separation subsystems such that while a at least one ion separation subsystem of the plurality of ion separation subsystems is in a regeneration cycle, the remaining ion separation subsystems of the plurality of ion separation subsystems are in an absorption cycle, wherein the remaining ion separation subsystems of the plurality of ion separation subsystems continue to generate the softened water stream used to produce the RO permeate, and wherein the plurality of ion separation subsystems are in the regeneration cycle while converting the ion exchange resin from a calcium and magnesium form to a sodium form.

17. The system of claim 12, wherein the resin regeneration system is configured to supply the fluid to the ion separation unit in a direction opposite a flow direction of the softened water stream from the ion separation unit.

18. The system of claim 12, wherein the ion separation unit is configured to flow the concentrated hardness mineral stream in a direction opposite a flow direction of the brine stream and the softened water stream.

19. The system of claim 12, wherein the hardness minerals comprise calcium and magnesium.

20. The system of claim 12, wherein the hardness limit is between approximately 100 to 600 ppm.

* * * * *